April 8, 1941.  J. E. MULLEN  2,237,744
CONTACT LENS AND METHOD OF MAKING THE SAME
Filed Dec. 30, 1939
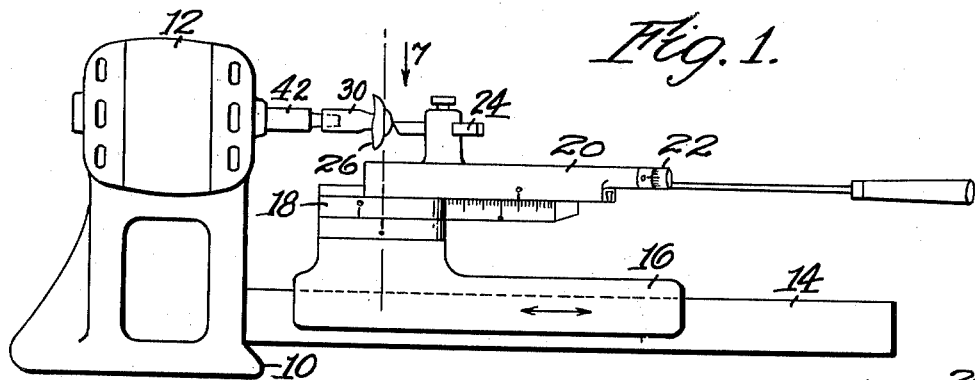
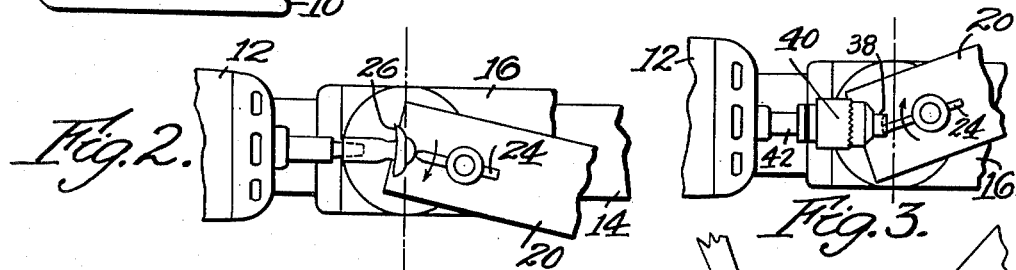
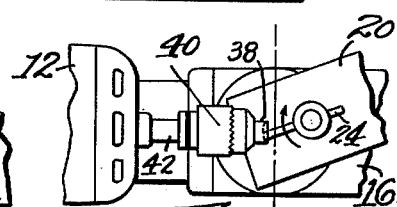
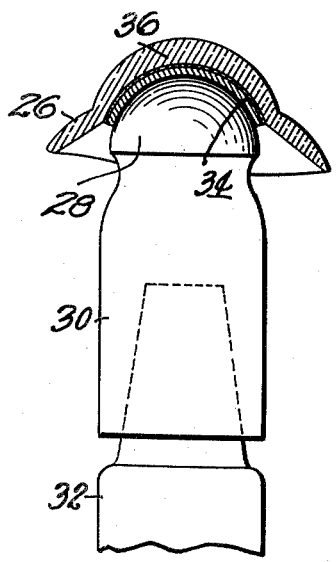
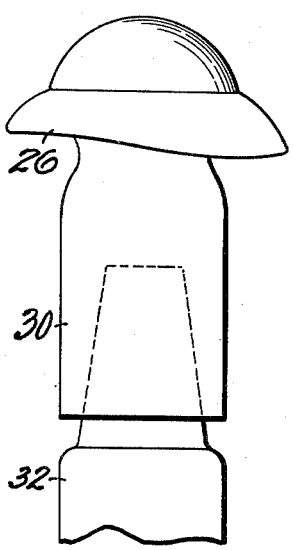
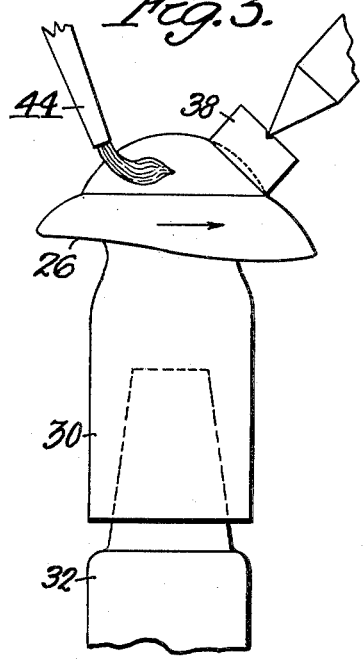
Inventor
John E. Mullen
By attorney
Charles R. Ray Patented Apr. 8, 1941

2,237,744

UNITED STATES PATENT OFFICE 2,237,744

CONTACT LENS AND METHOD OF MAKING THE SAME

John E. Mullen, Boston, Mass.

Application December 30, 1939, Serial No. 311,951

6 Claims. (Cl. 82—1)

In the art of making a contact lens, it has been the practice to use only one material successfully, namely, glass. But it is considered in the art that there exists the possibility of another material, giving rise to what is referred to as the "plastic" contact lens, and this is the subject matter to which the present invention is directed.

A contact lens, being worn directly on the human eyeball, presents certain objections when made of glass. A plastic contact lens obviates these objections. The best description of the word "plastic," a noun, as it is used in the sense meant in this invention and in the art of contact lenses, is the one given it by the plastics industry itself. The plastics industry considers a plastic to be any of numerous materials which lend themselves to certain types of fabrication procedure. The methods of fabricating a plastic into articles of merchandise for sale either as finished products or for use in finished products, such as ash trays, combs, parts for automotive equipment, electrical equipment, etc., largely determine what the plastics industry would classify as a plastic. In this invention, the word "plastic" is used in the sense in which it is used by the plastics industry and by the various house organs and periodicals of the plastics industry. A plastic is a material which lends itself usually to certain types of injection or pressure molding at certain temperatures, or which lends itself to machining operations. These definitions are far from adequate, as would also be any attempt to define plastics by any chemical analogy. While chemistry has been responsible largely for the development of most plastics, they are not all taken care of by any one chemical definition. The best definition that can be given is that which can be supplied by the trade or the plastics industry. To the plastics industry there exists a vast difference between "glass" and "plastic." The same difference exists in the mind of those in the art of contact lenses who refer to "glass contact lenses," and "plastic contact lenses."

For our purposes it is necessary in a contact lens to have a material which is described by its adaptability to our particular use. The material must have good optical properties, be workable by some process of fabrication, and be chemically harmless to the eye. Above all, the material must be resistant to breakage and shattering while being worn in the eye.

A material which has the latter property must be something other than glass, because the so-called unbreakable types of glass either do not lend themselves to the type of fabrication required in forming a contact lens, or in fact, whether they are called unbreakable or not, they of course do break and are only called unbreakable because of the way they break, which is harmless to nearly everything except the eye. While the average plastic material, suitable for our purposes in a contact lens, will break, it will only split, giving vastly less danger of damage to the eye before the one or two pieces which are left can be removed. In fact, a broken plastic contact lens, if indeed a plastic contact lens could be broken at all in the eye, could not by any conceivable stretch of the imagination be broken into more than one piece with one or two cracks in it.

There is a definite quality about the plastic which gives it this resistance to fracture or to shattering; this quality is its low hardness. This feature is the whole secret of early objections to the use of plastics for contact lenses. It was feared that even if a plastic contact lens could be made by molding operations entirely, even getting a clear and perfect lens portion, the latter would become scratched because of its softness in ordinary use, from being carried about. Furthermore, it was believed possible to make a lens good enough for clear vision only by molding processes. It is known in the art to be impossible to make a plastic lens of any sort, optically perfect, by grinding methods. The only way to make an optically perfect plastic lens is to mold it between optically perfect dies.

Now, with any material, fracture resistance, which is rather proportionate to resiliency, is proportionate and increases with a falling off in hardness. As hardness becomes lower, resistance to shattering or breaking which might form particles capable of hurting the eye increases. Conversely, to increase the resistance to fracture the hardness must be low in the material selected. Naturally it is desirable to select the material with the greatest resistance to fracture. To do this a material must be selected which is quite as low in hardness as can be reasonably worked by reliable fabrication methods.

In considering the possibilities of making a satisfactory plastic contact lens, several objections are encountered. First, die methods are practical only in production methods, but contact lenses to be successful must be made for the individual by the utmost personal and specialized attention to each patient. Second, each lens must be of different power according to the refraction needs for vision of the individual eye. Even after a lens is made, it usually must undergo a power change. Die methods do not admit of using precalculated powers nor of changing the power once it has been made. The thickness of a lens is one of the factors in determining its power, and die methods make thickness determination in custom-made contact lenses a very awkward procedure, entirely beyond the realm of reasonable manufacture. There are other objections to the die method for making contact lens corneal portions; for instance, the corneal portion must be made integral with the scleral portion.

Eliminating the die method, except as to preliminary blanking, the present inventor found that some method designed to the particular need of the particular lens must be tried. It was discovered that ordinary lens-making procedure as used in making glass lenses was also out of the question. However, most plastics lend themselves to machine-turning operations, such as on the lathe, and other machine-shop turning and cutting procedures. The present inventor is the first to discover that these procedures can be used to bring the lens portion of a contact lens to shape at a required thickness and proper curve in a matter of minutes. Even then, the polishing operation still presented the difficulty just stated, and this objection also has now been overcome by this invention.

Objects of the present invention include the provision of a contact lens and method of making it in which a plastic material forms the entire lens without the use of glass; the provision of an entirely custom made individual lens and method in which the inside of the lens conforms to and fits the eye as required with regard to shape, contour, and necessary clearance of the cornea for each particular patient; the provision of a plastic lens having a good curve, especially with regard to the uniformity of pressure over the supporting scleral or white-of-the-eye area, and method of making such a lens; and the provision of a plastic lens portion and method overcoming the above mentioned difficulties encountered in the prior art.

Other objects and advantages of the invention will appear hereinafter.

Reference is to be had to the accompanying drawing, in which

Fig. 1 is a view in elevation of apparatus for cutting the lens;

Fig. 2 is a partial plan view of Fig. 1;

Fig. 3 is a partial plan view of the apparatus shown in Fig. 1, but used to cut a grinding lap;

Fig. 4 is an elevation of the lens holder, showing the rough blanked lens in section; and Figs. 5 and 6 are views similar to Fig. 4 but showing the lens as cut-finished and in the process of grinding.

Any lens or lens system can have but two focus points, according to the principle of conjugate foci. In the system of the eye one of these points is located at the point of fixation, the object at which the eye is looking; the other point of focus is at the retina where the rays of light from the object come together again to form the image. The point of fixation and the point of focus on the retina of the image are the only two foci that can exist simultaneously in the eye system. Furthermore, the eye cannot fix upon a point nearer than, normally, a few inches from the cornea of the eye. By these principles, the present inventor discovered, with the two foci established at different points than the cornea or front of the eye, any object at the cornea, such as a speck on the cornea, or an imperfection on the lens portion of a contact lens, would not be visible to the subject. Unless it were large enough to reduce the admission of light noticeably, no confusion should be noticed. The eye cannot fix upon a blemish or imperfection or foreign body located on the cornea or on a contact lens being worn over the cornea.

The inventor discovered the application of the above principle to making possible the use of a contact lens which, instead of requiring greater optical finish as was believed, had need of nowhere as fine a finish as is needed even in a spectacle lens which is worn at a point removed further from the eye and nearer the point of fixation. The present inventor discovered that a badly scratched contact lens, even heavily abraded and pitted, may give perfect vision in every respect, as to clarity, visual acuity, etc. At this time several such badly scratched lenses, made according to the present invention, are actually in use, the patients having no complaint whatever to offer. The inventor himself has been wearing such a scratched lens regularly ever since his discovery of this principle over two years ago, with perfect comfort and no visual disturbance whatsoever. As long as the general curvature of the lens curve is true, no distortion or confusion whatever results to vision.

Besides the principles of conjugate foci, there is another factor in the contact lens which contributes to good vision; this is the fact that a capillary film of water over the front of the contact lens while being worn provides at all times the clarity and finish necessary to clarity of vision.

These considerations, i. e., the conjugate foci principle and the capillary film features have proved the feasibility of the plastic contact lens. Although it seemed unlikely that any rational method for making a contact corneal lens free from scratches could ever be devised, the present inventor has devised the following methods for making a corneal lens which has as few scratches and blemishes as possible, discovering that such a lens was more than serviceable and that its qualities, as a plastic, offered everything and more than had ever been offered by the contact lens which used glass.

To initiate the procedure of supplying a patient with contact lenses, the dispenser supplies the lens-maker with a model of the front of the eye, made in plaster of Paris or dental stone or any other positive modeling material. This model shows the cornea of the eye and an area of the sclerotic to considerable extent beneath the eyelids. The present inventor, wishing to preserve the original model of the eye, makes a duplicate of the original and a duplicate positive.

If proper skill has been used, the resultant contour of the formed blank is an exact duplicate of the model's contour. On a trimming wheel and with a coarse file the excess stock on the formed blank is removed around the edges.

The cornea is traced on the model with a pencil, thus indicating the limbus. The next operation is to cut and grind out the corneal portion of the contact lens so that it will clear the cornea. While the scleral band of the contact lens is required to follow the contour of the living scleral area on the eyeball, the corneal area is required to be ground into the curve of a true lens inside and to clear the cornea and limbus so that the contact lens shall at no time touch the cornea, in so far as such clearance is possible. Discomfort results if the supersensitive cornea and limbus are touched.

The inside corneal surface of the formed blank is cut away so that it does not rest on the cornea of the model. Cutting is continued until the clearance is thought to be sufficient so that there is no chance of the lens's touching the cornea.

After this roughing-out has been done, a grinding operation follows with a grinding tool of abrasive material mounted on an upright spindle to render the cleared-out area lenticular and even. As this grinding is being done, the pivot-point of the lens as it turns on the grinding tool is altered from one position to another in order to transfer pressure from one position to another in such a way that the cleared-out area will come into line with the cornea of the model as seen marked in pencil on the model. The grinding is continued until the cleared-out area is something larger than the area of the cornea on the model in order to prevent touching at the limbus. The cornea and limbus both are cleared in this way.

Then follows a semi-finish grind; by this time it becomes necessary to select an inside curve flat enough or sharp enough to clear the cornea at the vertex by the required amount and at the same time extend sufficiently beyond the limbus of the cornea. For this purpose the present inventor uses a series of grinding tools of various curvatures, from very flat to very sharp, over which a pad of cloth is stuck; on this pad is used an abrasive, and from the series the desired curve for the desired clearance requirements, either deep to go beyond the vertex, or flat to clear well laterally and above or below, is selected. The result of this grind is approximately the final curvature of the inside of the lens. A final polishing operation on the same tool renders the lens portion of the contact lens clear and polished on the inside.

Now, by grinding on the spindle the sharp break between the corneal curve and the scleral surface of the contact lens is rounded over for comfort in wearing; all that remains to be done to the inside scleral surface is to smooth up the rough surface left by the molding operation so it will be suitable for wearing on the eye. This is done with abrasive material and polish, to remove any undesirable protruding spots; while the area is smoothed and polished, the general irregularities of contour are carefully maintained because they are present in the living eye and aid in achieving good fit for the particular patient.

The contact lens is now finished as far as the inside of the lens portion is concerned, but there remains the problem of finishing the front surface to the desired corrective power.

To make the front curve of a contact lens to any required power, or to change the front curve of a contact lens from one power to another, the first consideration is the calculation of the thickness required in combination with the curve to be put onto the front of the lens. Given any back curve, constant index of refraction, and any required power; and keeping these three factors constant, the front curve of the lens and the vertex thickness at which to place this curve, are dependent upon each other. As the front curve is flattened, the thickness must be increased; or as the front curve is sharpened, the thickness must be decreased, while the other factors remain constant. In the making of a contact lens lens portion, it is important not only to calculate the required front curve and thickness, but to design a lens which will be suitable for wear in the eye. If the lens is too thick, it will be too cumbersome and heavy for wear; if the lens is too thin, it will be too fragile, apt to become bent, dented, spoiled, torn, split, or otherwise unsatisfactory. So the calculating of a contact lens must be done accompanied by designing operations, as by cross-section sketches, to show what the final lens will look like when cut. If a lens sketch looks too heavy, its thickness must be reduced, requiring a sharper curve for the front of the lens; a new calculation must be done, selecting a new thickness and determining what curve must go with it to give the required power on the known back curve, index, and required power. When the calculations have been done, the lens-maker may begin the manufacture of the lens.

Referring to the drawing in detail, there is shown in Fig. 1 the support 10 for the motor 12 and an adjacent base 14 for a sliding tool support 16. The latter has pivotally mounted thereon a calibrated tool slide 18 upon which is slidingly mounted the radius bar 20. This bar may be advanced or retracted by the vernier screw 22, also calibrated, which is arranged to move to bar 20 and turning tool 24 one one-hundredth mm. for each index mark. This structure provides a radius cutting machine for turning the lens 26.

A set of sleeve-tools, consisting of sphere-faced tools 28 mounted on taper sleeves 30 to be attached to the taper spindle 42, has been provided. The sphere faces 28 are varied according to the several known inside curves of the corneal portions of the various lenses. The proper sphere-tool is selected for the lens to be worked, and the blank lens is mounted by the inside of its corneal portion 36 on adhesive 34. The lens 26 is trued up to turn concentrically with the sleeve 30, and the latter is applied to the motor spindle 32, ready to be turned to the required dimensions.

On the radius-cutting machine drawing, two axes of rotation are involved, the one on which the lens turns, and the other the pivot about which as a center the turning-tool swings, so as to cut a sphere onto the front of the lens. As the lens turns, the tool in the radius-bar is swung simultaneously through an arc equal to the radius determined by how far back from the center the tool is adjusted. Thus, with the tool swinging on a radius and the lens turning at the same time, a sphere is generated onto the front face of the lens. The radius tool is adjusted or set to the radius required in the calculation plus the amount of stock to be removed to bring the lens down to the thickness of the calculation. Successive chips or cuts are taken until the excess stock has been removed and the final required radius of sphere has been achieved. The final cut is taken slowly and carefully in order to obtain as smooth a surface as possible with the least possible machine marks and the smallest possible surface irregularities; for in the polishing of the lens, the better the machined surface, the less grinding and polishing is necessary to remove these machine marks, and the more certain is it that the final lens will be a good lens. It was discovered by the inventor that due to the peculiar machining characteristics of plastics, which require a scraping-type tool which becomes dull faster than the ordinary inclined-top tool, that a flat-top tool made of tungsten-carbide or diamond, having a single round nose, is most satisfactory for this work.

When the lens has been cut down to its final curvature and thickness, the tool in the radius-bar is advanced ahead of center by a radius equal to that which has just been used to cut the convex curve of the lens. A piece of plastic material 38 suitable to machining in this manner, is held in a chuck 40 on the spindle 42, and the radius tool, now cutting a concave radius, cuts this curve into what is to become the lap for the lens.

The sleeve-mount with the lens on it is now caused to turn on a spindle 32 and the lap which has been cut in the manner just described, is used with a pivot on which it rotates and is thus caused to run on the lens surface with abrasive material applied with the brush 44 which grinds away the machining irregularities left by the radius-cutting operation and gives a relatively clear lens. Very brief hand-wiping of the lens with a cloth is sufficient to render the lens quite clear and adequate for use. After the lens has been unmounted and tested for power, quality, consistency of power, etc., it is even possible to change the power considerably by subsequent hand-polishing with a cloth. As much as two or more diopters change in the power of the lens is sometimes possible in this hand-polishing before the true character of the lens is destroyed enough to require re-cutting the lens. By this cutting and grinding method, it is possible sometimes to re-cut a lens as many as seven or eight times to change its power a little each time. Of course, when the lens becomes too thin, re-cutting becomes dangerous. Also, changes in power which are radical enough to require too great a change in curvature or thickness are often difficult. The stock for the required new power must be there, or else a new lens must be made from the beginning.

The foregoing invention for the making of the front curve of a lens portion for a contact lens applies to either a plastic corneal portion made separately from the scleral portion of the contact lens, or to a portion made simultaneously within the scleral band where the whole contact lens is made starting with one piece of material in the beginning. While it is possible to make such a lens portion separate of the scleral band and insert it into the scleral band at some time after the procedures are begun, this plan has not been adopted by the inventor; and it is preferred to start with one single piece of plastic as in a blank or formed blank and carry the work through without introducing any joints, laminations, insertions, or other integral or separate parts of the contact lens as a whole.

By the foregoing invention, the inventor has discovered how a contact lens corneal portion may be made using plastic only, using no glass; the inventor has discovered hereby how a corneal portion for a contact lens may be made by machining the required curve of the lens directly onto the surface of the lens and by grinding and polishing that machined surface to a lens of true vision-correcting value suitable to giving good visual acuity and clarity.

Also by this invention the inventor has made possible, in the art of vision correction with contact lenses, the use of materials much more suited to prosthetics than glass.

The above is a description of what are all the inventor's own procedures for the fabrication of an all-plastic, non-glass contact lens from the point of his receiving a model of the front of the patient's eye up to where the contact lens has been temporarily finished on the inside. Some adjustments may subsequently have to be made to this inside result after the lens has been tried on the eye.

Having thus described my invention and the advantages thereof, I do not wish to be limited to the details herein disclosed, otherwise than as set forth in the claims, but what I claim is:

1. A method for making a lens portion for a plastic contact lens which includes directly machining the desired curve onto the front of a rough plastic blank by means of a turning tool used with a curve generator.

2. A method for making a plastic lens portion for a contact lens which includes directly machining the desired curve onto the front of a rough plastic blank by means of a turning tool used with a curve generator.

3. The method of making a plastic lens portion for a contact lens which includes the steps of providing a lens holder and a tool which are relatively swingable; mounting a rough plastic blank on the holder; relatively rotating the lens and tool; and relatively swinging the holder and tool to cut a segment of a sphere directly onto the lens.

4. The method of making a plastic lens portion for a contact lens which includes providing a lens holder and a cutting tool, the holder and tool being relatively swingable and adjustable to and from each other; mounting a rough plastic blank on the holder; relatively rotating said lens and tool to cut a segment of a sphere onto the lens.

5. The process of making a plastic contact lens which compises mounting a rough lens blank by the inside curve of the corneal portion, on a spindle; providing a tool mounted to swing about an axis, swinging the tool about its center as the blank rotates, whereby a segment of a sphere is generated on the corneal portion.

6. The process of making a plastic contact lens which includes providing a curved work-supporting element substantially conforming to the rear curve of the corneal portion of the lens; mounting the lens on said element; turning said element and therefore the lens about their axes; and cutting the front of the corneal curve by means of a turning tool with a curve generator.

JOHN E. MULLEN.